United States Patent [19]

Dischert et al.

[11] Patent Number: 4,507,676
[45] Date of Patent: Mar. 26, 1985

[54] DIGITAL MATRIXING SYSTEM

[75] Inventors: Robert A. Dischert, Burlington; James J. Williams, Jr., Plainsboro, both of N.J.

[73] Assignee: RCA Corporation, New York, N.Y.

[21] Appl. No.: 437,263

[22] Filed: Oct. 28, 1982

[51] Int. Cl.³ .............................................. H04N 9/52
[52] U.S. Cl. ..................................................... 358/30
[58] Field of Search ................... 358/30; 364/754, 757

[56] References Cited

U.S. PATENT DOCUMENTS

| | | | |
|---|---|---|---|
| 4,160,264 | 7/1979 | Hailey | 358/30 |
| 4,229,800 | 10/1980 | Gregorian | 364/757 |
| 4,344,151 | 8/1982 | White | 364/754 |
| 4,449,194 | 5/1984 | Wilhelm | 364/757 |

FOREIGN PATENT DOCUMENTS 2013007A  8/1979  United Kingdom .

Primary Examiner—Michael A. Masinick
Attorney, Agent, or Firm—E. M. Whitacre; P. J. Rasmussen; W. H. Meise

[57] ABSTRACT

A matrix for digital video signals separates each coefficient into a binary part and a remainder. The binary part can be implemented very simply by a hardwired right shift. The remainder can be implemented using a ROM. Less ROM memory space is required than for implementing the entire coefficient in a ROM.

9 Claims, 2 Drawing Figures

DIGITAL MATRIXING SYSTEM

BACKGROUND OF THE INVENTION

The present invention relates to multiplying a digital signal by a coefficient, and more particularly to such multiplying as occurs in a matrix for video signals.

In television studio equipment it is frequently desired to generate Y (luminance) and I & Q (chroma) signals from R (red), G (green) and B (blue) signals in accordance with the following matrix equation:

$$\begin{bmatrix} Y \\ I \\ Q \end{bmatrix} = \begin{bmatrix} 0.3 & 0.59 & 0.11 \\ 0.6 & -0.28 & -0.32 \\ 0.21 & -0.52 & 0.31 \end{bmatrix} \begin{bmatrix} R \\ G \\ B \end{bmatrix}$$

Typical prior approaches use either ROMs (read only memories) to perform the multiplication or shifting and adders to perform the multiplication. In particular for the approach using ROMs to perform the multiplication, each of the three channels to generate the Y, I, and Q signals would comprise about 3 ROMs, 2 adders, and 6 latches, for a total of about 33 ICs (integrated circuits) for all 3 channels. Such a number of ICs is relatively expensive and consumes a large amount of power. Also the approach using shifting and adding to perform the multiplication requires a large number of ICs to achieve the desired accuracy.

It is therefore desirable to provide a digital multiplier, such as a matrix, that requires a minimum number of components and power.

SUMMARY OF THE INVENTION

Method and apparatus for digitally multiplying a digital signal by a coefficient, comprising providing a plurality of fraction signals of said digital signal, said fractions being in powers of one half, multiplying the smallest of said fractions by a multiplier to obtain a remainder signal, said remainder being left after factoring said coefficient into powers of two, and combining together said plurality of fraction signals and said remainder signal.

DETAILED DESCRIPTION

Figure 1:
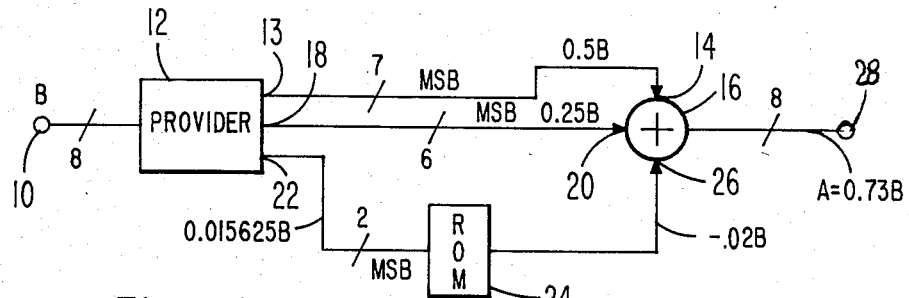
FIG. 1 is a simplified system illustrating the principles of the invention.

FIG. 1 shows a simple system for performing the operation A=0.73 B. First, it is noted that the equation can be rewritten as A=(0.75−0.02) B. The coefficient 0.75 can in turn be factored into powers of one-half, i.e., $\frac{1}{2}, \frac{1}{4}, \frac{1}{8}, \ldots$ etc., and thus, 0.75=0.5+0.25. Thus A=(0.5+0.25−0.02) B.

In FIG. 1 the digital signal B, which will be assumed to be 8 bits wide, is received at 8-bit input terminal 10 and applied to provider 12. Provider 12 provides fractional signals in powers of one-half. Since signal B is a binary signal, this can be done by simply shifting all bits to the right an appropriate number of times and discarding the appropriate number of LSB (least significant bits). In the assumed example, in order to obtain 0.5B signal, the 7 MSB (most significant bits) of the original B signal are provided at the 7 LSB outputs, respectively, of output 13, the original one LSB having been discarded. The resulting 0.5B signal is applied to the 7 LSB inputs of 8-bit input 14 of adder 16. Similarly, at output 18 the original 6 MSBs are provided at the 6 LSB positions of output 18 to provide the 0.25B signal to the 6 LSB inputs of 8-bit input 20 of adder 16, the original 2 LSB, having been discarded. Finally, at output 22 the 2 MSB of the original B signal are provided to provide a 0.015625B signal to the address inputs at ROM 24, the 6 LSBs having been discarded. It will therefore be appreciated that provider 10 comprises a simple wiring matrix that maps the input bits to the appropriate level of significance at each of the bits of the outputs.

In ROM 24 the 0.015625B signal is multiplied by −1.28 to produce a −0.02B signal that is applied to input 26 of adder 16. In ROM 24 the input addresses 00, 01, 10, and 11 respectively correspond to output states 000, 001, 011, and 100. These output states are rounded off from fractional levels, which for an 8-bit digital video signal introduces negligible error. The 0.5B, 0.25B, and −0.02B signals are added together in adder 16 to produce at 8-bit output 28 a 0.73B signal, which is the desired result for signal A. Alternatively, the 3 MSBs of signal B, representing a 0.03125B signal, could be applied to ROM 24, and multipled by −0.64 by ROM 24 to produce the required −0.02B signal for adder 16. In ROM 24 the input address 000, 001, 010, 011, 100, 101, 110, and 111 respectively correspond to output states 000, 001, 001, 010, 011, 011, 100, and 100 again with rounding off. In either case, only a small portion of the original B signal is required to be multiplied, thereby reducing the amount of memory required in RAM 24.

Figure 2:
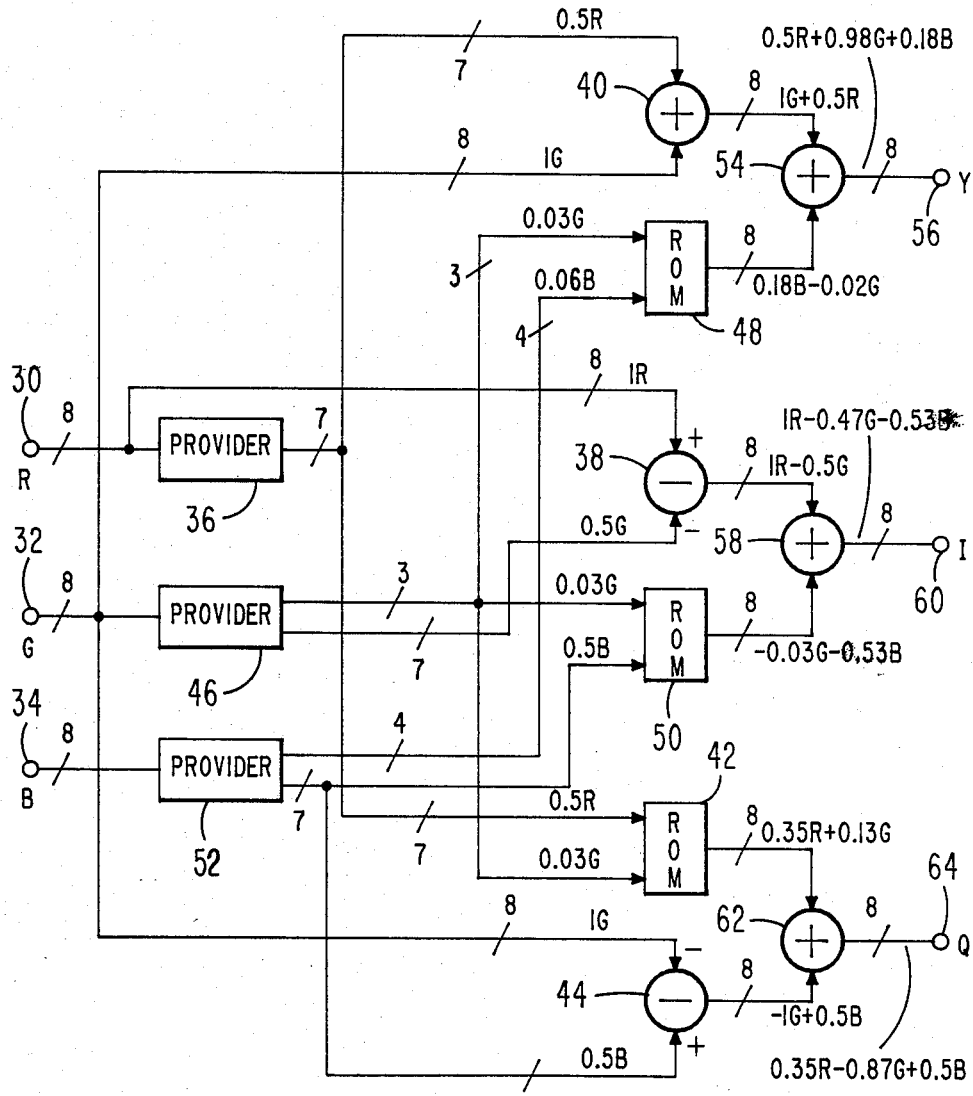
FIG. 2 is a system for matrixing television signals.

FIG. 2 shows an embodiment using the principles of the invention to matrix R, G, and B television signals into Y, I, and Q signals. For simplicity, the matrix given above is divided by the value of the highest coefficient contain therein (0.6), i.e. it is "normalized". The resulting matrix is:

$$\begin{bmatrix} Y \\ I \\ Q \end{bmatrix} = \begin{bmatrix} 0.5 & 0.98 & 0.18 \\ 1.0 & -0.47 & -0.53 \\ 0.35 & -0.87 & 0.52 \end{bmatrix} \begin{bmatrix} R \\ G \\ B \end{bmatrix}$$

Eight-bit (256 grey levels) R, G, and B signals are received at 8-bit inputs 30, 32, and 34 respectively. The input R signal is applied to provider 36 and to subtractor 38. The output of provider 36 supplies a 7-bit 0.5R signal to adder 40, and to ROM 42. The input G signal is applied to adder 40, subtractor 44, and to provider 46. Provider 46 supplies a 3-bit 0.03 (rounding off) G signal to ROMs 48, 50, and 42, and a 7-bit 0.5 G signal to subtractor 38. The input B signal is applied to provider 52. Provider 52 supplies a 4-bit 0.06B signal derived from the 4 MSB of the B signal to ROM 48, and a 7-bit 0.5B signal to ROM 50 and to subtractor 44.

Considering now the Y channel, adder 40 provides an 8-bit 1G+0.5R signal to adder 54. ROM 48 process the input 0.03G signal to provide a −0.02G first output signal at its output, and also processes the 0.06B input signal to provide a 0.18B second output signal at its output which is added in ROM 48 to the first output signal. The ROM 48 which has 8 address lines, is addressed by 7 inputs. The eighth is not used and thus should be tied either high or low. The resulting 8-bit 0.18B−0.02G output signal from ROM 48 is applied to adder 54. The output signal from adder 54 is thus an 8-bit 0.5R+0.98G+0.18B signal or Y, which is available at 8-bit output 56.

In the I channel, subtractor 38 provides an 8-bit 1R−0.05G signal to adder 58. ROM 50 processes the 0.03G input signal to provide an −0.03G signal, and processes the 0.5B input signal to provide a −0.053B signal. The resulting 8-bit −0.03G−0.53B output signal from ROM 50 is applied to adder 58. The output signal from adder 58 is an 8-bit 1R−0.47G−0.53B signal, or I, and is present at 8-bit output 60.

In the Q channel, ROM 42 processes the 0.5R input signal to provide a 0.35R output signal, and also process the 0.03G input signal to provide a 0.013G output signal. The resulting 8-bit 0.35R+0.13G output signal from ROM 45 is applied to adder 62. Subtractor 44 provides a −1G+0.5B output signal to adder 62. The output of adder 62 is an 8-bit 0.35R−0.87G+0.5B signal which is available at 8-bit output 64. This is almost the Q signal (0.52B is the exact required amount). The slight error is unobjectionable, but if desired a small ROM can be used at the B signal input of subtractor 44 to obtain the exact value for the B signal.

The above invention can be implemented using 2 adders, 1 ROM and 1 latch (not shown) per channel for a total of about 18 ICs, i.e. about one-half that of the prior art.

What is claimed is:

1. Apparatus for digitally multiplying a digital video signal by a constant to produce a desired signal, said apparatus comprising:

dividing means for dividing said digital video signal by powers of two to obtain at least one fraction signal of the type $\frac{1}{2}^n$ of said digital signal, where n is an integer and may include zero;

first summing means coupled to said dividing means for summing together x number of said fraction signals, where x may equal one, to produce an approximate signal approximating said desired signal;

multiplying means coupled to said dividing means for receiving a selected fraction signal therefrom for multiplying said selected fraction signal by a predetermined constant to produce a remainder signal equal to the difference between said desired signal and said approximate signal; and second summing means coupled to said first summing means and to said multiplying means for summing said remainder and approximate signals to produce said desired signal.

2. Apparatus as claimed in claim 1, wherein said multiplying means comprises a ROM.

3. Apparatus as claimed in claim 1, wherein said second summing means comprises one of an adder and a subtractor.

4. Apparatus as claimed in claim 1 wherein said selected fraction signal is the smallest of said fraction signals.

5. A method for forming color television video signal from television R, G and B signals, comprising:

applying said R signal to first dividing means for dividing the amplitude of said R signal by two to form half-R signals;

applying said B signal to second dividing means for dividing the amplitude of said B signal by the fourth power of two ($2^4$) to form a one-sixteenth-B signal;

applying said G signal to third dividing means for dividing the amplitude of said G signal by the fifth power of two ($2^5$) to form a one-thirty-second-G signal;

coupling said half-R signal from said first dividing means to a first summing means together with said G signal for summing said G and half-R signals to form a G-plus-half-R signal;

coupling said second dividing means and said third dividing means to a first multiplying means for multiplying said one-sixteenth B and said one-thirty-second-G signals by constants to form a Y residue signal; and coupling said first multiplying means and said first summing means to a second summing means for summing said Y residue signal with said G-plus-half-R signal to form the Y video signal.

6. A method according to claim 5, further comprising the steps of:

applying said G and B signals to fourth and fifth dividing means, respectively, for dividing the amplitude of said G and B signals by the first power of two ($2^1$) to form half-G and half-B signals;

applying said R and half-G signals to first subtracting means for taking the difference between aid R and half-G signals to form an R-minus-half-G signal;

applying said one-thirty-second G and said half-B signal to a second multiplying means for multiplying said one-thirty-second G signals and said half-B signals by constants to form an I residue signal; and applying said R-minus-half-G and I residue signals to a third summing means for summing said R-minus-half-G signal with said I residue signal to form an I video signal.

7. A method according to claim 6, further comprising the steps of:

applying said G and said half-B signals to a second subtracting means for taking the difference between said G signals and said half-B signals to form minus-G-plus-half-B signals;

applying said half-R and said one-thirty-second G-signals to a third multiplying means for multiplying said half-R and one-thirty-second-G signals by constants to form a Q residue signal; and applying said -minus-G-plus-B signals and said Q residue signal to a fourth summing means for summing sai minus-G-plus-B signals with said Q residue signals to form a video Q signal.

8. A method for digitally multiplying a digital video signal by a constant to produce a desired signal comprising the steps of:

applying said digital video signal to a dividing means for dividing said digital video signal by powers of two to obtain at least one fraction signal of the type $\frac{1}{2}^n$ of said digital video signal, where n is an integer and may include zero;

applying at least one said fraction signal to a summing means for providing an approximation to said desired signal by summing together x number of said fraction signals, where x may equal one, to produce an approximate signal;

applying a selected fraction signal to a multiplying means for multiplying said selected fraction signal by a predetermined constant to produce a remainder signal equal to the difference between said desired signal and said approximate signal; and applying said remainder signal and said approximate signals to a summing means for summing said remainder and approximate signals.

9. A method according to claim 8 wherein said selected fraction signal is the smallest of said fraction signals.

* * * * *